US008601861B1

(12) United States Patent
Vershinin et al.

(10) Patent No.: US 8,601,861 B1
(45) Date of Patent: Dec. 10, 2013

(54) SYSTEMS AND METHODS FOR DETECTING THE FLAME STATE OF A COMBUSTOR OF A TURBINE ENGINE

(75) Inventors: Mikhail Petrovich Vershinin, Moscow (RU); Alexander Moiseev, Moscow (RU); Scott Kopcho, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/572,107

(22) Filed: Aug. 10, 2012

(51) Int. Cl.
*G01M 15/14* (2006.01)

(52) U.S. Cl.
USPC ..................................... 73/112.01; 73/112.05

(58) Field of Classification Search
USPC .......................................... 73/112.01, 112.05
See application file for complete search history.

(56) References Cited

U.S. PATENT DOCUMENTS

| 4,672,324 A * | 6/1987 | van Kampen ................ 307/653 |
| 5,073,104 A * | 12/1991 | Kemlo ............................ 431/12 |
| 5,168,699 A | 12/1992 | McCarty et al. |
| 5,726,891 A | 3/1998 | Sisson et al. |
| 5,813,849 A | 9/1998 | Schwartz et al. |
| 5,952,930 A | 9/1999 | Umeda et al. |
| 6,141,957 A | 11/2000 | Tsukagoshi et al. |
| 6,518,574 B1 | 2/2003 | Castleman |
| 6,823,254 B2 | 11/2004 | Faymon et al. |
| 7,492,269 B2 | 2/2009 | Matteson et al. |
| 7,942,038 B2 * | 5/2011 | Ziminsky et al. .......... 73/112.01 |
| 8,417,434 B2 * | 4/2013 | Williams et al. ............. 701/100 |
| 8,452,515 B2 * | 5/2013 | Drohan et al. ................ 701/100 |
| 8,474,269 B2 * | 7/2013 | Panov ............................. 60/779 |

* cited by examiner

*Primary Examiner* — Freddie Kirkland, III
(74) *Attorney, Agent, or Firm* — Nixon & Vanderhye P.C.

(57) ABSTRACT

Systems and methods of determining a flame state within a combustor of a turbine engine make use of characteristics of an output pressure of a compressor of the turbine engine and a temperature of exhaust gases of the turbine engine to make a determination. If the first and/or second derivatives of the output pressure of the compressor and the first and/or second derivatives of the exhaust gas temperature of the turbine engine are all positive during at least portions of a predetermined period of time, one can determine that a flame has ignited in the combustor. If those values are negative during at least portions of a predetermined period of time, one can determine that a flame has been extinguished in the combustor.

20 Claims, 4 Drawing Sheets

SYSTEMS AND METHODS FOR DETECTING THE FLAME STATE OF A COMBUSTOR OF A TURBINE ENGINE

BACKGROUND OF THE INVENTION

Turbine engines typically include a flame detector that monitors a state of a flame in a combustor of the turbine engine. Most flame state detectors are optical detectors. Unfortunately, it is difficult for most such optical detectors to withstand the extreme operating conditions that exist in or adjacent a combustor of a turbine engine without a cooling means of some sort. Those optical detectors that can withstand the extreme operating conditions without cooling means are quite expensive.

Many optical flame state detectors require water or liquid cooling in order to operate in or adjacent a combustor of a turbine engine. Unfortunately, cooling fluid leaks can be quite damaging to the surrounding components. Thus, even providing cooling to an optical flame state detector can be somewhat risky.

In view of these drawbacks of existing flame state detectors, it would be desirable to have some means of determining the flame state within a combustor of a turbine engine that does not require expensive optical components, or the provision of cooling fluids.

BRIEF DESCRIPTION OF THE INVENTION

In a first aspect, the invention may be embodied in a method of determining a flame state of a combustor of a turbine engine that includes the steps of determining at least one of a first derivative and a second derivative of an output pressure of the compressor of the turbine engine, determining at least one of a first derivative and a second derivative of a temperature of the exhaust gases output by the turbine engine, and determining a flame state of a combustor of the turbine engine based on the determined derivatives of the output pressure of the compressor and the temperature of the exhaust gases.

In a second aspect, the invention may be embodied in a system for determining a flame state of a combustor of a turbine engine that includes means for determining at least one of a first derivative and a second derivative of an output pressure of the compressor of the turbine engine, means for determining at least one of a first derivative and a second derivative of a temperature of the exhaust gases output by the turbine engine, and means for determining a flame state of a combustor of the turbine engine based on the determined derivatives of the output pressure of the compressor and the temperature of the exhaust gases.

In a third aspect, the invention may be embodied in a system for determining a flame state of a combustor of a turbine engine that includes a pressure change determining unit that determines at least one of a first derivative and a second derivative of the output pressure of the compressor of the turbine engine, a temperature change determining unit that determines at least one of a first derivative and a second derivative of the temperature of the exhaust gases output by the turbine engine, and a flame state determining unit that determines a flame state of a combustor of the turbine engine based on outputs of the pressure change determining unit, and the temperature change determining unit.

DETAILED DESCRIPTION OF PREFERRED EMBODIMENTS

Systems and methods embodying the invention monitor the compressor output pressure of a turbine engine along with a temperature of the exhaust gases produced by the turbine engine. Characteristics of the compressor output pressure and the exhaust temperature can be used to determine if a flame has ignited in the combustor, or if a flame has been extinguished. Thus, monitoring these values and making appropriate judgments about their characteristics makes it possible to eliminate the need for an optical flame state detector.

Figure 1:
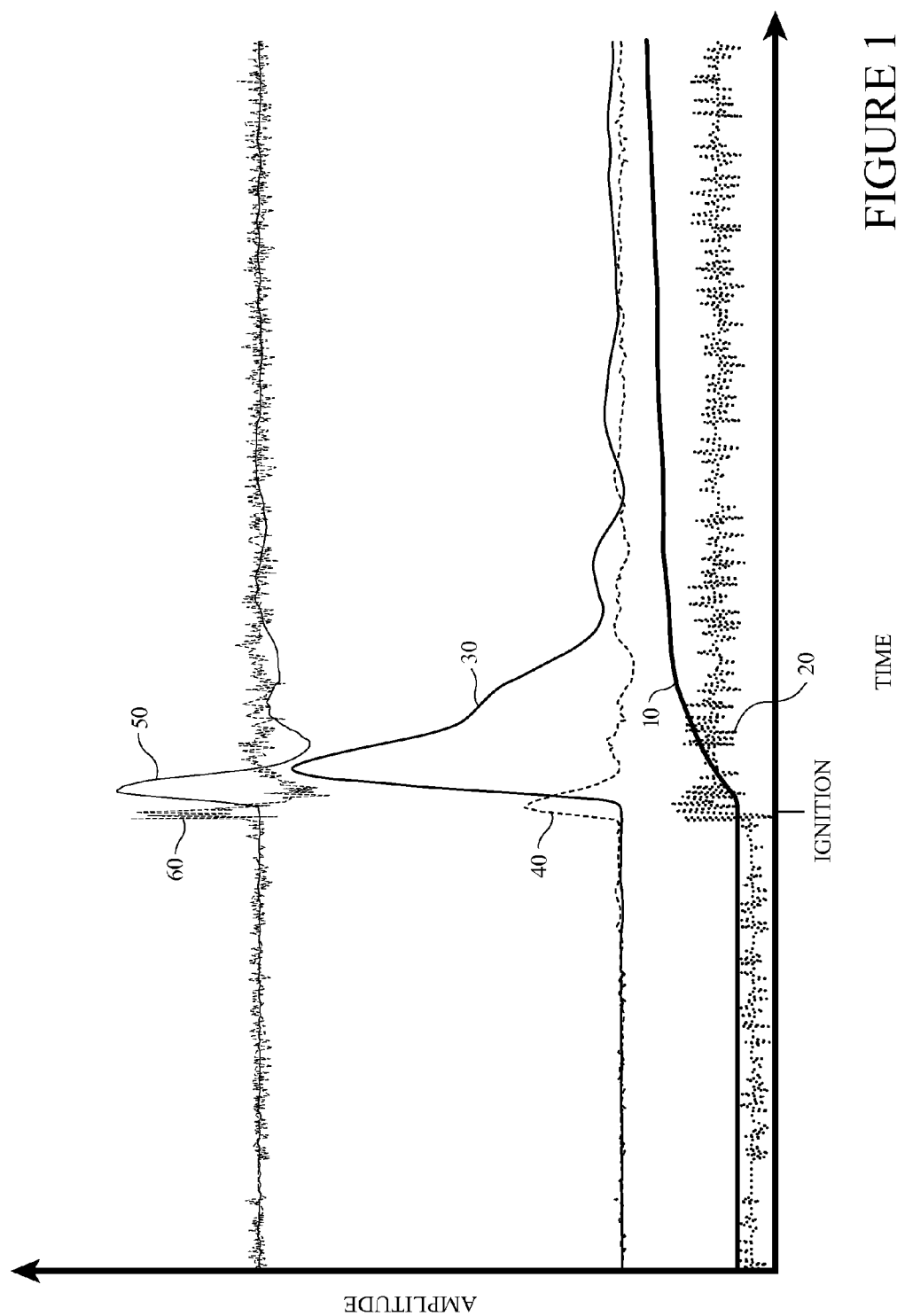
FIG. 1 is a diagram illustrating how the output pressure of a compressor, first and second derivatives of the output pressure of the compressor, the temperature of exhaust gases of a turbine engine, and first and second derivatives of the temperature of the exhaust gases of a turbine engine change when a flame is ignited in a combustor of the turbine engine.

FIG. 1 illustrates how the output pressure of a compressor of a turbine engine, the temperature of exhaust gases of the turbine engine and first and second derivatives of both those values change during a flame ignition event. The line identified with reference number 10 in FIG. 1 illustrates how the exhaust gas temperature of a turbine engine changes over time as a flame is first ignited in the combustor of the turbine engine. The line identified with reference number 20 illustrates how the compressor output pressure varies over time as a flame is first ignited in a turbine engine. The line identified with reference number 30 in FIG. 1 indicates the rate of change, or the first derivative, of the exhaust gas temperature during a flame ignition event, and the line identified with reference number 40 represents the rate of change, or first derivative, of the compressor output pressure during ignition. The line identified with reference number 50 represents the second derivative of the exhaust gas temperature, and the line identified with reference number 60 represents the second derivative of the compressor output pressure.

As is apparent in FIG. 1, the compressor output pressure 20 rapidly increases as soon as the flame is ignited. As is also apparent in FIG. 1, the exhaust gas temperature 10 steadily rises after flame ignition. The rise in exhaust gas temperature 10 does not begin to occur until a small time delay has elapsed after flame ignition. However, the rise in exhaust gas temperature 10 continues long after flame ignition has occurred.

The first and second derivatives of the exhaust temperature 30 and the compressor discharge pressure 40 have a particular relationship with one another during normal operation of the turbine. They have a different relationship during ignition and flame out.

During normal operation of the turbine, when the rate of change, or first derivative, of the exhaust gas temperature 30 is increasing, the rate of change, or first derivative, of the compressor discharge pressure 40 is decreasing. The converse is also true. In other words, during normal operation of the turbine, when the rate of change, or first derivative, of the exhaust gas 30 is decreasing, the rate of change, or first derivative, of the compressor discharge pressure 40 is increasing. This relationship is reflected by the portion of the lines identified with reference numbers 30 and 40 in FIG. 1 that occur after flame ignition. The relationship between the second derivative of the exhaust gas temperature and the second derivative of the compressor output pressure follows the same trend.

However, during a flame ignition event, the rate of change (first derivative) of the exhaust gas temperature 30 and the rate of change (first derivative) of the compressor output pressure 40 both increase. This relationship is reflected by the portions of the lines identified with reference numbers 30 and 40 at time of and immediately after the flame ignition event. Because the two rates of change only increase together during flame ignition, and immediately thereafter, any time that one detects that both rates of change (first derivatives) are positive, and relatively high values, one can determine that flame ignition has occurred.

The same is true for the second derivatives of the exhaust gas temperature and the compressor output pressure. In other words, if one determines that the second derivatives of the exhaust gas temperature and the compressor output pressure are both positive, and relatively high values over a small period of time, one can determine that a flame ignition event has occurred.

Figure 2:
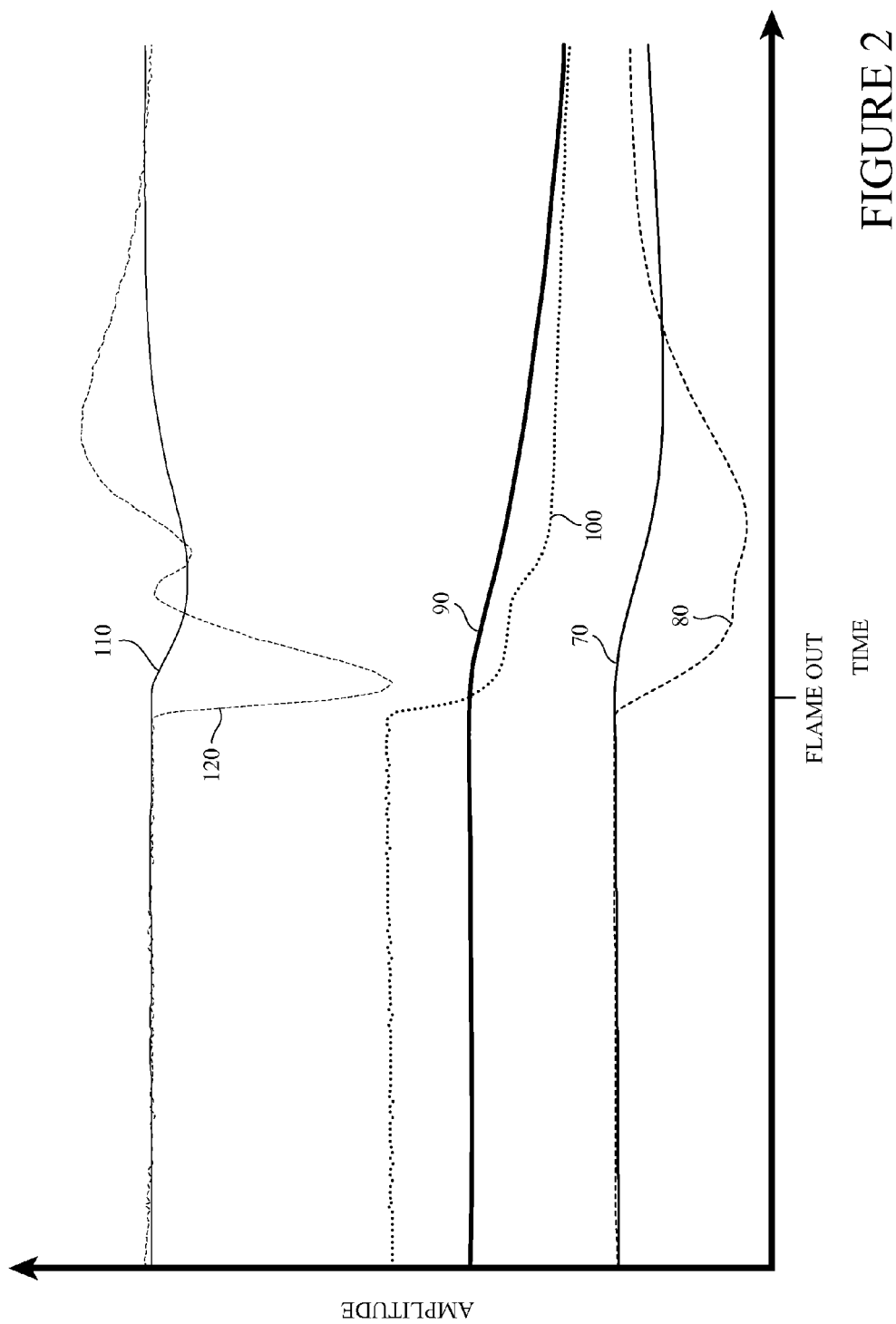
FIG. 2 is a diagram illustrating how the output pressure of a compressor, first and second derivatives of the output pressure, the temperature of exhaust gases of a turbine engine, and first and second derivatives of the temperature of the exhaust gases of a turbine engine change when a flame is extinguished in a combustor of the turbine engine.

FIG. 2 illustrates how the compressor output pressure and exhaust gas temperature, and first and second derivatives of those values, vary during a flame out or flame extinguishing event. The line identified with reference number 70 indicates how the exhaust gas temperature changes over time when the flame in a combustor is extinguished. The line identified with reference number 80 indicates how the compressor output pressure changes over time when the flame is extinguished. The line identified with reference number 90 illustrates the rate of change of the exhaust gas temperature, which is a first derivative of the exhaust gas temperature 70, and the line identified with reference number 100 illustrates the rate of change of the compressor output pressure, which is a first derivative of the compressor output pressure 80. The line identified with reference number 110 illustrates the second derivative of the exhaust gas temperature 70, and the line identified with reference number 120 illustrates the second derivative of the compressor output pressure 80.

As noted above, during normal operations, the first and second derivatives of the exhaust gas temperature and the compressor output pressure tend to change in opposite directions. In other words, when the first and second derivatives of the compressor output pressure are increasing, the first and second derivatives of the exhaust gas temperature are decreasing, and vice versa. However, when the flame is extinguished, the first and second derivatives of the exhaust gas temperature and the compressor output pressure both go negative. Thus, when one detects that the first and/or second derivatives of both the exhaust gas temperature and compressor output pressure are negative, and below certain threshold values, one can determine that the flame has been extinguished.

Systems and methods for determining when a flame in a combustor of a turbine engine has first ignited or has been extinguished monitors characteristics of the compressor output pressure and the exhaust gas temperature, and first and second derivatives of those values, and looks for trends that match the patterns illustrated in FIGS. 1 and 2.

Figure 3:
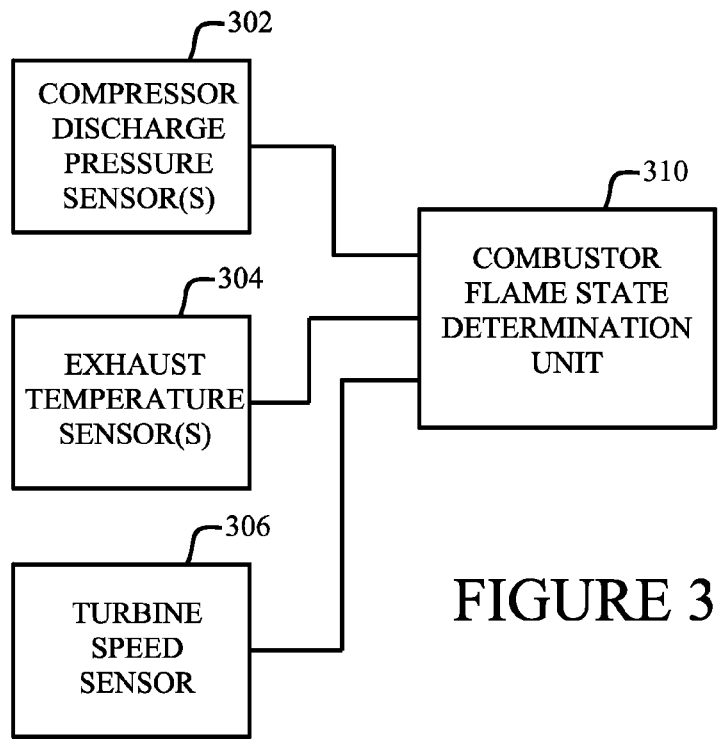
FIG. 3 is a block diagram illustrating elements of system that can be used to determine a flame state of a combustor of a turbine engine.

FIG. 3 illustrates a system that is capable of determining when a combustor flame has been ignited or been extinguished. The system includes a combustor flame state determination unit 310, which is operatively coupled to one or more compressor discharge pressure sensors 302 and one or more exhaust gas temperature sensors 304. The combustor flame state determination unit 310 may also be operatively coupled to a turbine speed sensor 306, and/or other sensors.

The compressor discharge pressure sensors 302 may sense the pressure of compressed air at the output of the compressor, or at one or more stages within the compressor. Alternatively, or in addition, one or more sensors may be provided within a combustor of the turbine engine, which receives the compressed air produced by the compressor. Multiple signals from multiple pressure sensors could be operatively coupled to the combustor flame state determination unit 310, and the combustor flame state determination unit may calculate a compressor output pressure using those multiple input signals. Alternatively, the signals from multiple pressure sensors could be processed by a sensor system, and a single compressor output pressure value could be provided to the combustor flame state determination unit 310.

Likewise, a single exhaust gas temperature sensor may be provided, or multiple exhaust gas temperature sensors 304 could be positioned at various different locations. If multiple sensors are provided, they may all be operatively connected to the combustor flame state determination unit 310, and the combustor flame state determination unit 310 may calculate an average or median exhaust gas temperature from the signals produced by the sensors. Alternatively, an average or median exhaust gas temperature signal which is generated from the data produced by multiple sensors may be provided to the combustor flame state determination unit 310.

Figure 4:
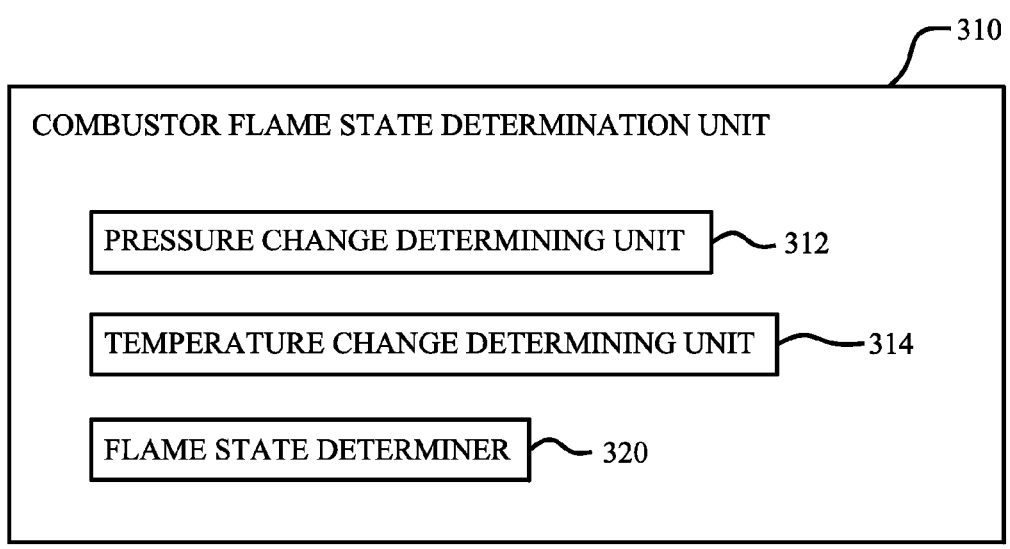
FIG. 4 is a diagram illustrating elements of a flame state determination unit that can determine a flame state of a combustor of a turbine engine.

Some of the elements of the combustor flame state determination unit 310 are illustrated in FIG. 4. The combustor flame state determination unit 310 could be implemented using software running on a general purpose computer. In this instance, the modules or units within the combustor flame state determination unit 310 would be implemented as various software modules. Alternatively, one or more of the units or modules could be implemented as a combination of software and specific circuit elements. In still other embodiments, some or all of the modules or units of the combustor flame state determination unit 310 may be implemented as circuits or application specific integrated circuits.

As illustrated in FIG. 4, the combustor flame state determination unit 310 includes a pressure change determination unit 312. This unit monitors the compressor output pressure and determines if the compressor output pressure is increasing or decreasing over time. The pressure change determining unit 312 may also calculate the first and second derivatives of the compressor output pressure.

Likewise, a temperature change determining unit 314 monitors the exhaust gas temperature and determines if the exhaust gas temperature is increasing or decreasing over time. The temperature change determining unit may also calculate the first and second derivatives of the exhaust gas temperature.

Finally, the combustor flame state determination unit 310 includes a flame state determiner 320 which utilizes the information produced by the pressure change determining unit 312, the temperature change determining unit 314 to make a judgment about whether a flame has just been ignited in the combustor or has just been extinguished. The flame state determiner 320 may also receive and use information from other elements, such as a turbine speed sensor 306, which is used to correct flame detection thresholds and to make a determination about the flame state. The flame state determiner 320 will use predetermined logic rules to make a judgment about the flame state, as will be described in more detail below.

Figure 5:
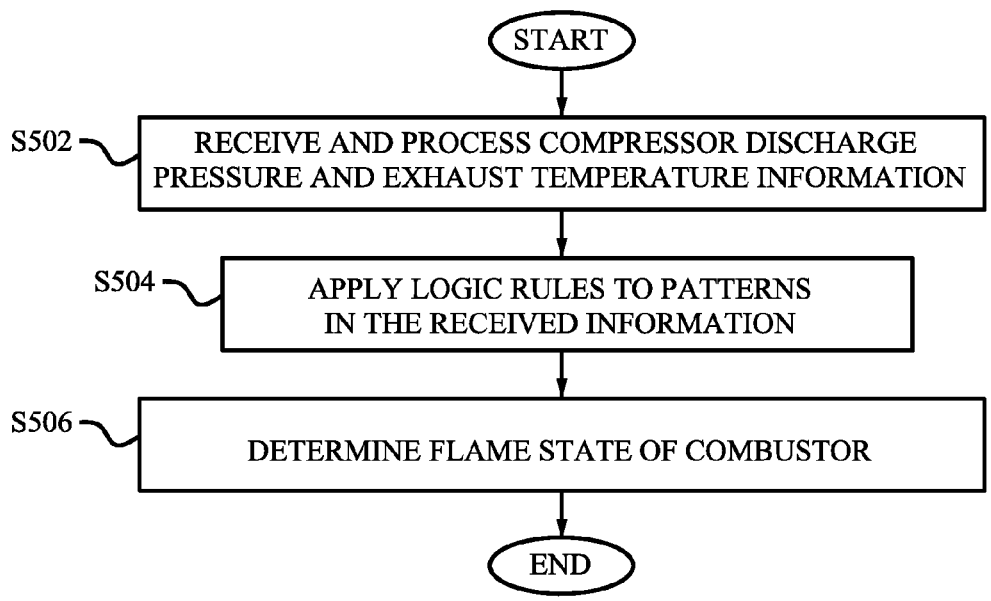
FIG. 5 is a flow chart illustrating steps of a method of determining a flame state of a combustor of a turbine engine.

Steps of a method embodying the invention are illustrated in the flow chart in FIG. 5. As shown in FIG. 5, the method begins in step S502, where a combustor flame state determination unit 310 receives and processes information regarding the compressor discharge pressure and the exhaust gas temperature. As explained above, this could include receiving the actual compressor discharge pressure and exhaust gas temperature, as well as calculating the first and second derivatives of those values.

In step S504, the patterns in the received information are examined and compared to logic rules. For example, if the first and/or second derivatives of the exhaust gas temperature and the compressor discharge pressure are trending in opposite directions, this would indicate that the turbine is operating normally. However, if the first and/or second derivatives of the compressor discharge pressure and exhaust gas temperature are both negative over the same predetermined period of time, this would indicate that the flame in the combustor has been extinguished. Similarly, the first and/or second derivatives of the compressor discharge pressure and exhaust gas temperature are both positive over the same predetermined period of time, this would indicate that a flame ignition event has occurred.

Finally, in step S506, the flame state determiner 120 makes a determination about whether a flame has just ignited in the combustor or whether a flame has just been extinguished in the combustor based on the result of the analysis that is performed in step S504 As noted above, other information from other elements may also be used to make such a determination.

The logic rules used by the flame state determiner 120 to make a judgment about whether a flame has just ignited in the combustor or whether a flame has just been extinguished in the combustor are based upon how the characteristics of the compressor output pressure and exhaust gas temperature change during flame ignition events and flame extinguishing events, as illustrated in FIGS. 1 and 2.

The ultimate determination that a flame ignition event has occurred can be based on both the fact that first and/or second derivatives of the compressor output pressure and exhaust gas temperature are both increasing, and based on whether the absolute values of the derivatives are above threshold values. Similarly, a determination that a flame has been extinguished may be based on the fact that first and/or second derivatives of the exhaust gas temperature and compressor discharge pressure are negative, and based on whether the values of the first and second derivative are below threshold values.

As explained above, by monitoring the characteristics of the compressor output pressure and the exhaust gas temperature, it is possible to determine the state of the flame in a combustor of a turbine engine without using optical detectors. Also, the determination of the flame state can be made using information about the turbine engine that is already being monitored. Thus, no additional sensors need be added to replace the optical sensor that is being eliminated.

While the invention has been described in connection with what is presently considered to be the most practical and preferred embodiments, it is to be understood that the invention is not to be limited to the disclosed embodiments, but on the contrary, is intended to cover various modifications and equivalent arrangements which are encompassed within the spirit and scope of the appended claims.

What is claimed is:

1. A method of determining a flame state of a combustor of a turbine engine, comprising:
    determining at least one of a first derivative and a second derivative of an output pressure of the compressor of the turbine engine;
    determining at least one of a first derivative and a second derivative of a temperature of the exhaust gases output by the turbine engine; and
    determining a flame state of a combustor of the turbine engine based on the determined derivatives of the output pressure of the compressor and the temperature of the exhaust gases.

2. The method of claim 1, wherein the step of determining a flame state of the combustor comprises determining that a flame has ignited in the combustor if the first derivative of the output pressure of the compressor and the first derivative of the temperature of the exhaust gases are both positive during a predetermined period of time, and at least one of the first derivative of the output pressure of the compressor and the first derivative of the exhaust gas temperature is greater than a threshold value.

3. The method of claim 1, wherein the step of determining a flame state of the combustor comprises determining that a flame has ignited in the combustor if the first derivative of the output pressure of the compressor and the first derivative of the temperature of the exhaust gases are both positive during at least portions of a predetermined period of time, the first derivative of the output pressure of the compressor is greater than a first threshold value and the first derivative of the exhaust gas temperature is greater than a second threshold value during the predetermined period of time.

4. The method of claim 1, wherein the step of determining a flame state of the combustor comprises determining that a flame has ignited in the combustor if the first derivative of the output pressure of the compressor and the first derivative of the temperature of the exhaust gases are both positive during at least a portion of the same predetermined period of time.

5. The method of claim 1, wherein the step of determining a flame state of the combustor comprises determining that a flame has ignited in the combustor if the first derivative of the output pressure of the compressor is positive during a first portion of a predetermined period of time and the first derivative of the temperature of the exhaust gases is positive during a second portion of the predetermined period of time, the second portion being subsequent to the first portion.

6. The method of claim 1, wherein the first determining step comprises determining the first and second derivatives of the output pressure of the compressor, wherein the second determining step comprises determining the first and second derivatives of the temperature of the exhaust gases output by the turbine engine, and wherein the step of determining a flame state of a combustor of the turbine engine is based on the determined first and second derivatives of the output pressure of the compressor and the temperature of the exhaust gases.

7. The method of claim 6, wherein the step of determining a flame state of the combustor comprises determining that a flame has ignited in the combustor if the first and second derivatives of the output pressure of the compressor and the first and second derivatives of the temperature of the exhaust gases are both positive over portions of a predetermined period of time.

8. The method of claim 6, wherein the step of determining a flame state of the combustor comprises determining that a flame has ignited in the combustor if the first and second derivatives of the output pressure of the compressor are both positive and above threshold values during a first portion of a predetermined period of time, and if the first and second derivatives of the temperature of the exhaust gases are both positive and above threshold values during a second portion of the predetermined period of time.

9. The method of claim 6, wherein the step of determining a flame state of the combustor comprises determining that a flame has been extinguished in the combustor if the first and second derivatives of the output pressure of the compressor and the first and second derivatives of the temperature of the exhaust gases are all negative over at least portions of a predetermined period of time.

10. The method of claim 1, wherein the step of determining a flame state of the combustor comprises determining that a flame has been extinguished in the combustor if the first derivative of the output pressure of the compressor and the first derivative of the temperature of the exhaust gases are both negative during portions of a predetermined period of time, and at least one of the first derivative of the output pressure of the compressor and the first derivative of the exhaust gas temperature is below a threshold value.

11. The method of claim 1, wherein the step of determining a flame state of the combustor comprises determining that a flame has been extinguished in the combustor if the first derivative of the output pressure of the compressor and the first derivative of the temperature of the exhaust gases are both negative during portions of a predetermined period of time, the first derivative of the output pressure of the compressor is smaller than a first threshold value during a portion of the predetermined period of time, and the first derivative of the exhaust gas temperature is smaller than a second threshold value during a portion of the predetermined period of time.

12. A system for determining a flame state of a combustor of a turbine engine, comprising:
   means for determining at least one of a first derivative and a second derivative of an output pressure of the compressor of the turbine engine;
   means for determining at least one of a first derivative and a second derivative of a temperature of the exhaust gases output by the turbine engine; and
   means for determining a flame state of a combustor of the turbine engine based on the determined derivatives of the output pressure of the compressor and the temperature of the exhaust gases.

13. A system for determining a flame state of a combustor of a turbine engine, comprising:
   a pressure change determining unit that determines at least one of a first derivative and a second derivative of the output pressure of the compressor of the turbine engine;
   a temperature change determining unit that determines at least one of a first derivative and a second derivative of the temperature of the exhaust gases output by the turbine engine; and
   a flame state determining unit that determines a flame state of a combustor of the turbine engine based on outputs of the pressure change determining unit, and the temperature change determining unit.

14. The system of claim 13, wherein the flame state determining unit determines that a flame has ignited in the combustor if the first derivative of the output pressure of the compressor and the first derivative of the temperature of the exhaust gases are both positive during at least portions of a predetermined period of time, and at least one of the first derivative of the output pressure of the compressor and the first derivative of the exhaust gas temperature is greater than a threshold value.

15. The system of claim 13, wherein the flame state determining unit determines that a flame has ignited in the combustor if the first derivative of the output pressure of the compressor and the first derivative of the temperature of the exhaust gases are both positive during at least portions of a predetermined period of time, the first derivative of the output pressure of the compressor is greater than a first threshold value, and the first derivative of the exhaust gas temperature is greater than a second threshold value.

16. The system of claim 13, wherein the flame state determining unit determines that a flame has been extinguished in the combustor if the first derivative of the output pressure of the compressor and the first derivative of the temperature of the exhaust gases are both negative during at least portions of a predetermined period of time, and at least one of the first derivative of the output pressure of the compressor and the first derivative of the exhaust gas temperature is lower than a threshold value.

17. The system of claim 13, wherein the flame state determining unit determines that a flame has been extinguished in the combustor if the first derivative of the output pressure of the compressor and the first derivative of the temperature of the exhaust gases are both negative during at least portions of a predetermined period of time, the first derivative of the output pressure of the compressor is lower than a first threshold value during a portion of the predetermined period of time, and the first derivative of the exhaust gas temperature is lower than a second threshold value during a portion of the predetermined period of time.

18. The system of claim 13, wherein the pressure change determining unit also determines both the first and second derivatives of the output pressure of the compressor of the turbine engine, wherein the temperature change determining unit determines both the first and second derivatives of the temperature of the exhaust gases output by the turbine engine, and wherein the flame state determining unit determines a flame state of a combustor of the turbine engine based on the determined first and second derivatives of the output pressure of the compressor and the temperature of the exhaust gases output by the turbine engine.

19. The system of claim 18, wherein the flame state determining unit determines that a flame has ignited in the combustor if the first and second derivatives of the output pressure of the compressor and the first and second derivatives of the temperature of the exhaust gases are all positive during at least portions of a predetermined period of time.

20. The system of claim 18, wherein the flame state determining unit determines that a flame has been extinguished in the combustor if the first and second derivatives of the output pressure of the compressor and the first and second derivatives of the temperature of the exhaust gases are all negative during at least portions of a predetermined period of time.

* * * * *